United States Patent
Pecca et al.

(10) Patent No.: US 6,510,781 B2
(45) Date of Patent: Jan. 28, 2003

(54) PLUNGER PUMP

(75) Inventors: Jeffrey Pecca, Neshanic Station, NJ (US); Frank Leotti, Jr., Manville, NJ (US); John Diekman, Bloomindale, NJ (US)

(73) Assignee: Komline-Sanderson Engineering Corp., Peapack, NJ (US)

( * ) Notice: Subject to any disclaimer, the term of this patent is extended or adjusted under 35 U.S.C. 154(b) by 3 days.

(21) Appl. No.: 09/906,212

(22) Filed: Jul. 16, 2001

(65) Prior Publication Data

US 2001/0039875 A1 Nov. 15, 2001

Related U.S. Application Data

(63) Continuation-in-part of application No. 09/219,266, filed on Dec. 23, 1998, now Pat. No. 6,276,259.

(51) Int. Cl.$^7$ ............................................... F16J 15/18
(52) U.S. Cl. ........................................................ 92/168
(58) Field of Search ........................... 92/140, 155, 168, 92/151

(56) References Cited

U.S. PATENT DOCUMENTS

| | | | |
|---|---|---|---|
| 3,356,036 A | 12/1967 | Repp | 92/168 |
| 4,283,062 A | * 8/1981 | Catanzaro et al. | 92/168 |
| 4,521,163 A | * 6/1985 | Stahlkopf | 92/168 |
| 4,775,303 A | * 10/1988 | Liska | 92/168 |
| 5,403,169 A | 4/1995 | Yokoi et al. | 417/568 |
| 5,507,630 A | * 4/1996 | Hegebarth | 417/454 |

OTHER PUBLICATIONS

McLube 1708L, Dry Film Lubricant, McLube Division of McGee Industries Inc.
Konline–Sanderson brochure: The Komline–Sanderson Heavy–Duty Plunger Pump for Sludges, Slurries and Wastes. 1996.
Komline–Sanderson brochure: The Komline–Sanderson KSK Compact Plunger Pump for Sludges, Slurries and Wastes. 1995.

* cited by examiner

Primary Examiner—Edward K. Look
Assistant Examiner—Thomas E. Lazo
(74) Attorney, Agent, or Firm—Lerner, David, Littenberg, Krumholz & Mentlik, LLP

(57) ABSTRACT

An adjustable packing gland assembly is mounted for adjustable engagement with a seal and a packing in a fluid pumping apparatus for sealing against fluid leakage about reciprocating plungers and like pumping elements, the adjustable packing gland also stabilizes the pumping element. A stuffing box is formed in the pump housing and spaced packing gland shoulder bolts bottom out on that housing. A packing gland is disposed in the stuffing box and is slidably mounted on the spaced adjustment studs, each of the shoulder bolts having adjusting nuts and pipe sleeves disposed for precision adjustment of the packing gland. Bearing against the plunger on either side of the packing and seal are guiding elements made of a low wear material which possesses lubricity as against the plunger. The upper guide may be integrally formed with the gland. An eccentric liner is made of a similar material as the guides, rendering it a low wear item in need of little or no lubrication. A scraper may also be provided, below or remote from the seal, to protect the seal and packing from damaging materials.

27 Claims, 4 Drawing Sheets

PLUNGER PUMP

CROSS REFERENCE TO RELATED APPLICATION

The present application is a continuation-in-part of U.S. patent application Ser. No. 09/219,266, filed Dec. 23, 1998, U.S. Pat. No. 6,276,259 the disclosure of which is, hereby incorporated by reference.

TECHNICAL FIELD

This invention relates generally to plunger pumps or like pumps for fluid and mixed fluid and semi-solid pumping systems, and more particularly to a seal and stabilizing arrangement by which a packing gland assembly limits leakage from the pump. The packing gland assembly also adds rigidity to the pumping element being sealed by a packing and a seal. An eccentric bearing liner made of a low wear and lubricated material decreases maintenance and wear, and is also an environmentally friendly alternative. Together, the packing gland assembly and eccentric bearing liner provide for a cleaner operating pump, approaching "leak-free" status, which requires less maintenance and care than existing assemblies.

BACKGROUND OF THE INVENTION

The use of "packing" in pumps and other apparatus having reciprocating, slidable or rotatable members for moving fluids or mixed fluids and semi-solids is well known. Packings are typically made up of a resilient or at least compressible material which serves a sealing purpose through its compression and retention of a lubricant, most often an oil or graphite. Rough adjustment of the degree of compression is possible and often necessary on a periodic basis, the adjustment being made typically through the tightening of the member (referred to as a packing gland in a plunger pump) which holds the packing in compression. (Reoiling is sometimes necessary on a periodic basis, the oiling usually applied manually).

Generally, it has been accepted that the packing wears during the operation of pumps and other apparatus utilizing packing in such fluid pumping systems. Thus, leakage occurs around the packing which causes a loss in volumetric capacity of the systems. Moreover, the fluids, often containing undesirable and potentially hazardous components, spill into the vicinity of the pump and overall fluid-moving apparatus. In a plunger pump, the packing gland is made of cast metal and is held to the cast iron plunger housing by bolts. In order to hold and compress the packing in the stuffing box, the gland is tightened down by the bolts to further compress the packing in the stuffing box. Eventually, the packing is no longer effective and must be replaced. To prolong the life of the packing, and avoid the time-consuming replacement of it, a lubricant is often freely applied.

The assembly of the packing gland typically leaves wide clearances, particularly since the packing gland is cast and the housing and plunger are cast. Therefore, as the plunger moves up and down in a plunger pump, or the pumping element moves otherwise in other pumps, there is often a continuous horizontal shifting of the plunger. This leads to increased wear, sometimes creating an "hour-glass" shape instead of a cylindrical shape, and increased leakage.

Another area of the plunger pump or like pump which requires maintenance and care is the bearing for the eccentric, which is the expedient that allows for pump stroke and capacity variations. In a plunger pump, the eccentric is housed above the plunger and carries the plunger, via a connecting rod, through a particular pump stroke. The bearing used between the eccentric and the connecting rod is typically a Babbit bearing. The bearings are recognized as a wear item, and are oiled by associated and messy mechanical oilers. Eventually, the liner must be replaced, and this must be done at the expense of operation time. Also, disposal of the liner poses a hazard, as does the oil from the mechanical oiler which must be used to care for the bearing. The use of oil also risks possible contamination of the fluid that is being pumped, and can thus cause an environmental hazard.

In general, the industry has accepted the leakage and maintenance problems associated with plunger pumps and the like pumps. Great effort has not been made to alleviate the shortcomings which have simply been tolerated over the years. The silence of advances in this area must be broken.

SUMMARY OF THE INVENTION

The present invention relates more specifically to a pump with a housing and a pumping element disposed for movement within the housing so that liquid can be moved through the pump. A packing and a seal are associated with the pump housing and the pumping element for sealing the pump from the loss of liquid. A packing retention element retains the packing and the seal in position for their sealing function. A stabilizing element is disposed on the side of the packing remote from the interior of the pump housing. The stabilizing element bears against the pumping element during movement of the pumping element and facilitates stabilization of the same.

Preferably, a scraper is provided that filters grit and sand and other debris to prevent it from entering the stuffing box and reaching the seal and causing damage to the seal, stabilizing elements and packing.

Preferably, a second stabilizing element can be provided on the side of the packing which is adjacent to the interior of the pump housing, in order to provide for further stabilization of the pumping element. The clearance between the stabilizing element and the pumping element is preferably about 0.005 inch and the clearance between the second stabilizing element and the pumping element is about 0.005 inch.

In a preferred embodiment, the second stabilizing element is twice the size of the stabilizing element.

In a preferred embodiment, the stabilizing element is made at least partially of acetal material.

In the embodiment having a second stabilizing element, such second stabilizing element is preferably made at least partially of acetal material and is twice as big as the stabilizing element. The second stabilizing element may also be made at least partially of acetal material.

In another embodiment, the stabilizing element and the second stabilizing element are made at least partially of polyetheretherketone.

Preferably, the seal and the scraper are made of UHMW polyethylene.

The pump in one embodiment is a plunger-type pump wherein the pumping element is a plunger which reciprocates within the pump housing. The packing retention element is a packing gland which is connected to the pump housing.

Preferably, at least one adjustment stud is provided with respect to the packing retention element and the pump housing. The adjustment stud provides for the adjustment of the force supplied to the packing and the seal by the packing retention element to thereby increase the sealing efficacy of the packing and the seal. The adjustment stud preferably includes a stabilizing section associated with the packing retention element, the stabilizing section permitting movement of the packing retention element in a first direction, often vertical, and to limit movement of the packing retention element in a second direction, often horizontal. Preferably, the adjustment stud also includes an adjustment section which provides for the adjustment of the packing retention element in the first direction.

In another embodiment of the present invention, the pump housing includes an area for receiving the packing retention element and a threaded opening therein. The adjustment stud has a first threaded portion which threadedly engages a threaded opening in the receiving area. The adjustment stud preferably includes a shoulder between the first threaded portion and the stabilizing section. The shoulder being provided to engage a stop surface in the receiving area, whereby the adjustment stud is rigidly attached to the housing. Preferably, a plurality of adjustment studs are provided and the packing retention element includes a plurality of stud openings through which such plurality of adjustment studs can be provided. Also, it is preferable that the stabilizing sections of the studs be smooth.

Preferably, the adjustment sections of the adjustment studs include a second threaded portion and a sleeve portion bearing on the packing retention element. The second threaded portion is remote from the first threaded portion. An adjustment nut is provided on the second threaded portion for adjustably forcing the sleeve portion onto the packing retention element in order to facilitate the sealing function of the packing.

Preferably, a dry film lubricant is provided on the packing to facilitate the sealing effect of said packing and permit smooth operation of the pumping element.

In addition to the stabilizing element, the pump can be a plunger-type pump operated by an eccentric connected to the plunger by a connecting arm, and further including an eccentric liner which is highly resistant to wear. Preferably, the eccentric liner is made of reinforced Teflon such as RULON sold by Saint Gobain of Bristol, R.I.

The present invention also relates to a pump for pumping liquid, the pump having a housing with an interior, a pumping element for movement within the housing, a seal and a packing associated with the pump housing and the pumping element to seal the pump from the loss of liquid from the interior of the pump housing. A packing retention element can be provided for applying a force to the packing and the seal from the side of the packing and the seal remote from the interior of the pump housing. A stabilizing element can also be provided for facilitating the stabilization of the pumping element. The clearance between the stabilizing element and the pumping element is preferably 0.005 inch. Preferably, the above pump further comprises a scraper for protecting the seal and packing from sand and grit. In addition, the pump comprises a second stabilizing element for providing further stabilization of the pumping element. In a preferred embodiment, the clearance between the second stabilizing element and the pumping element is about 0.005 inch.

Preferably, the second stabilizing element is twice the size of the stabilizing element.

In a preferred embodiment, the stabilizing element and the second stabilizing element are at least partially made of acetal material.

In a preferred embodiment, the stabilizing element and the second stabilizing element are at least partially made of polyetheretherketone material.

Preferably, in the above pump, the scraper and seal are made of UHMW polyethylene.

The above pump may be a plunger-type according to another aspect of the invention, a pump is provided for pumping liquid. The pump has a pump housing having an interior, a pumping element for movement within the housing, a packing element associated with the pump housing, and a stabilizing element to facilitate the stabilization of the pumping element during its movement. Preferably, the clearance between the stabilizing element and the pumping element is in the range of about 0.008 inch to 0.010 inch.

Preferably, the above pump further includes a second stabilizing element for further stabilization of the pumping element during its movement. The clearance between the second stabilizing element and the pumping element is preferably in the range of about 0.008 inch to about 0.010 inch.

In another aspect of the present invention, a kit is provided for retrofitting an already existing plunger type pump having a pump housing, a stuffing box and packing therein. The kit includes a gland for exerting a force on the packing, a stabilizing element having an annular shape and being constructed and arranged for disposition above the packing, an adjustment stud for adjusting the force exerted by the packing gland on the packing. The adjustment stud includes a stabilizing section which permits vertical movement of the packing gland and limits horizontal movement of the same, and further includes a first threaded portion for threading into existing bolt holes in the plunger housing. It further includes a second threaded portion above the stabilizing section and an adjustment nut threadingly associated with the second threaded portion and a sleeve disposed around the second threaded portion and between the adjustment nut and the packing gland in assembled condition. In a preferred embodiment of this aspect of the invention, a secondary stabilizing element having the annular shape and being constructed for disposition below the packing is provided. In addition, in a preferred embodiment, the stabilizing element and the packing gland are integrally formed as a single element, and that single element is made of nylon. In a preferred embodiment, the secondary stabilizing element is made of UHMW polyethylene.

In another aspect of the present invention, a method of installing a sealing and stabilizing assembly is provided. The kit described generally above is used, and the method includes the steps of placing the secondary stabilizing element below the packing, if it is part of the kit, placing the packing in place above the secondary stabilizing element if it is provided, placing the stabilizing element and the packing gland above the packing, installing the adjustment stud through a hole in the packing gland, tightening the stud until the stud bottoms out on the plunger housing, and adjusting the force exerted against the packing by turning the adjustment nut.

Accordingly, it is an object of the present invention to provide stabilizing elements on at least one side of a stuffing box to facilitate the stabilization and sealing of the pump at the intersection of the pumping element and its housing.

It is another object of the present invention to provide a seal and a scraper made of material highly resistant to wear to prevent liquid from leaking out of the pump.

It is another object of the present invention to provide such stabilizing elements in conjunction with the packing gland, and a further object to make such packing gland and stabilization elements, together with the packing, adjustable.

It is another object of the present invention to provide an adjustable packing gland assembly to control and limit leakage through packing used in fluid pumping systems.

It is another object of the present invention to provide an adjustable packing gland assembly which enables the packing gland to tighten the packing more evenly, minimizes overtightening and uneven pressure forces on the packing as it is tightened and prevents premature wear of the packing and plunger.

It is another object of the present invention to provide an adjustable packing gland assembly which also adds rigidity and support to a reciprocating, slidable or rotatable element being sealed by the packing, thus reducing wear and potential hour-glassing of the walls of the element and wear of other pump elements.

It is another object of the present invention to provide an adjustable packing gland which is adapted for retrofitting in existing pumping apparatus.

It is another object of the present invention to provide an eccentric liner which is made of a material highly resistant to wear, and a further object to provide such material having lubricity to facilitate the smooth operation of the eccentric of a pump.

BRIEF DESCRIPTION OF THE DRAWINGS

With these and other objects and purposes in mind of the present invention, the description which follows below will be better understood when taken with the drawings identified as follows.

DESCRIPTION OF THE EMBODIMENTS OF THE INVENTION

Figure 1:
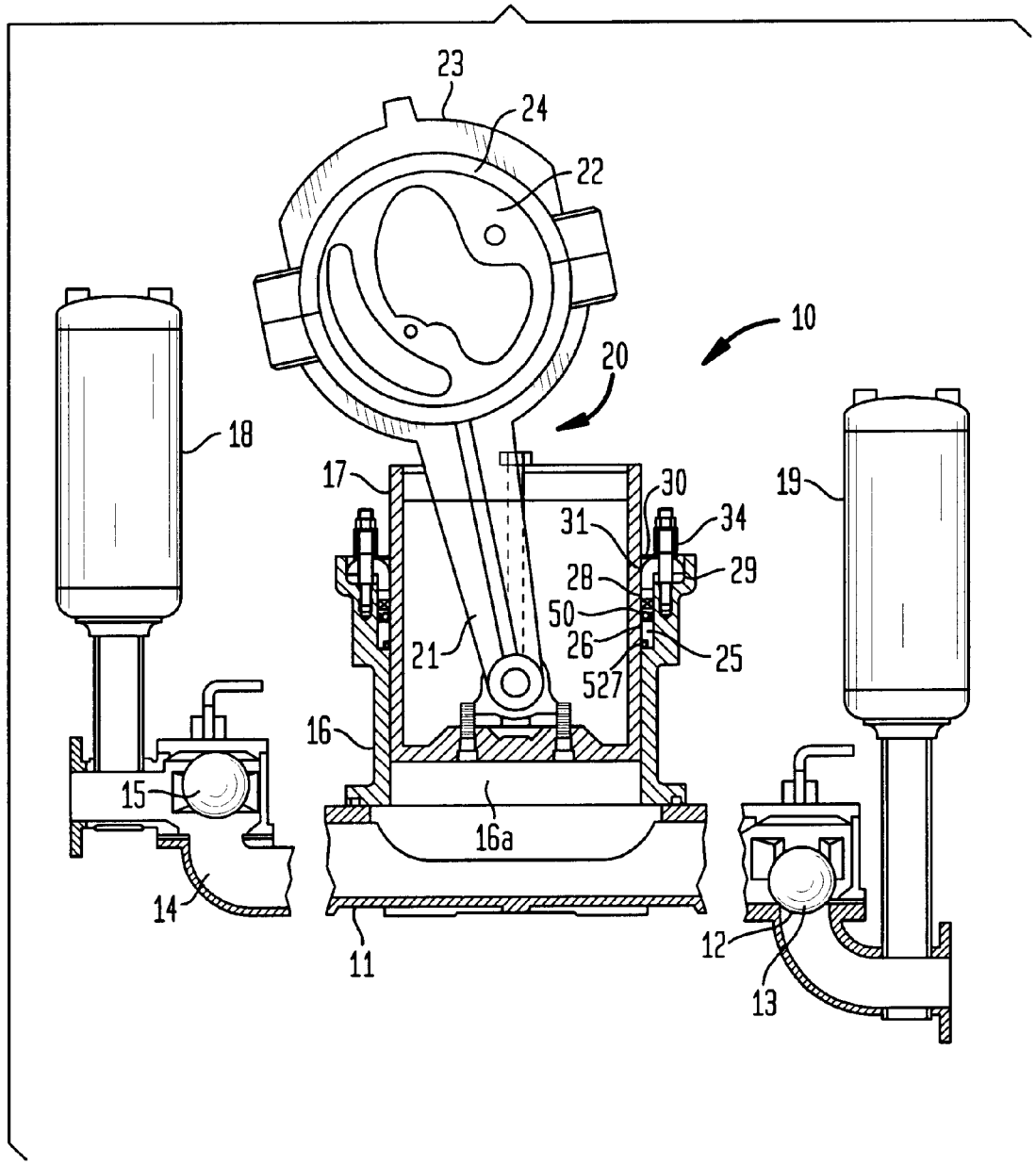
FIG. 1 is a diagrammatic partial cross-section of a plunger-type pumping apparatus with an enlarged cross section of the single plunger housing, the plunger and the packing showing one embodiment of the adjustable packing gland assembly in accordance with the present invention.

The invention will be described as a positive displacement plunger pumping system generally designated as 10 in the drawings. Such pumping apparatus are sold on the open market by Komline-Sanderson, Inc. of Peapack, N.J. for waste water treatment and sludge management problems where heavy duty services on difficult sludges, paper slurries and other tough waste water problems exist.

Where the fluid or fluid mixture with semi-solid calls for relatively large internal clearances to prevent clogging, a positive displacement plunger type pumping apparatus 10, as shown in FIG. 1 or with multiple stages, can be effectively used.

These and other fluid pumping systems which utilize seals in association with reciprocating plungers, pistons, and sliding and rotatable shafts, rods and the like to seal against the escape of the fluid from the slurries or other complex fluid mixtures being pumped by such pumping systems are well known in the art. Therefore, those skilled in the art will readily recognize that the description of the invention as applied to this type of fluid pumping system is only for purposes of illustration and not by way of limitation, and that the present invention is equally applicable to the sealing arrangements for multi-plex plunger pumps (i.e., those having more than one plunger assembly), reciprocating plungers, slidable and rotatable shafts, rods and other elements used in other types of fluid pumping apparatus and systems without departing from the spirit and scope of the present invention.

FIG. 1 shows that pumping apparatus 10 has a sized main fluid transport conduit 11 for transporting the fluid or fluid mixture being pumped by the pumping apparatus 10. Main transport conduit 11 has at one end a suction inlet 12 with a suction inlet valve 13, and at the opposite end a discharge outlet 14 with a discharge outlet valve 15. Suction inlet valve 13 and discharge outlet valve 15 are conventional check valves which open and close as a function of the pressure in the main transport conduit 11, which is in turn dictated by the stroke of the plunger. Communicating with the main transport conduit 11 is a plunger housing 16 defining a plunger bore 16a in which a plunger 17 is mounted for reciprocal action to draw the fluid mixture in through the suction inlet 12 on an upstroke and discharge this mixture through the discharge outlet 14 on a downstroke. Optional air chambers as at 18 and 19 are provided to reduce and dampen pulsations in the fluid mixture being delivered by such plunger type pumping systems.

Plunger 17 is reciprocated in the plunger housing 16 by an eccentric/connecting rod assembly 20 which has a connecting arm 21 connected to the plunger 17, a cap 23, and adjustable eccentric 22, housed between eccentric flanges which varies the stroke of the plunger and thus the volumetric capacity of the positive displacement pump 10. Eccentric/connecting rod assembly 20 may be driven by any suitable type of constant or variable speed drive means not shown, but typically a motor driven shaft connected to a plurality of plunger pump assemblies. The eccentric 22 is arranged in the connecting rod assembly 20 (rod 21 and cap 23), there being an eccentric bearing liner 24 disposed there between. The liner 24 is shown in and more fully described with respect to FIGS. 5A–5C below.

In order to preserve the integrity of the exterior surface of the plunger 17 and other parts during operation of the pump 10, the exterior surface of the plunger 17 is polished or otherwise treated to create a relatively hard, smooth surface. "Hour-glassing" of prior art plungers has been known to occur during operation of a given pump apparatus under the normal wear and tear from contact of the exterior surface of the plunger with the seal. Polishing the exterior surface of the plunger aids in reducing friction between the exterior surface of the plunger and the inner surface of the seal. Stabilization of the plunger, as discussed below, also prevents premature wear since the plunger will not "slop" through its strokes.

As in all fluid pumping apparatus, it is necessary to seal the plunger housing 16 and the plunger 17 so that the fluid or fluid mixture with semi-solids does not leak to the exterior of pump 10.

As is known, an annular stuffing box 25 is formed in the inner wall of the plunger housing 16. Within that annular stuffing box 25, a resilient or at least compressible packing, a plastic seal and a scraper are provided. The packing is, for instance, a braid of woven rope-like material which can be square in cross-section, chevron-shaped Palmetto 100 MBF or any other suitable material. Often, a Teflon braid is provided as the top layer of the packing. The materials of which the packings have been made include synthetic fibers, which are graphite impregnated within a lubricant for lubricity, Kevlar, a highly durable material, and Teflon, a material with high lubricity. The packings may be split for ease of installation without removal of the plunger. The prior art packings have required periodic oiling so as to maintain their sealing properties as against the plunger which rides along the interior of the packing. The seal and scraper are, for example, all machined solid plastic pieces. The seal and scraper are made of, preferably, UHMW polyethylene.

In accordance with the present invention, the stuffing box 25 is filled with a packing assembly made up of any suitable packing 26. An annular lower pilot 27a and an annular upper pilot 27b are also provided in the stuffing box 25. A main seal 50 and a scraper 52 are also located in the stuffing box 25. The scraper 52 is optional and serves as the first line of defense by preventing grit, sand or other damaging material from entering the stuffing box 25. Thus, the scraper 52 prolongs the life of the lower and upper annular pilots 27a and 27b, as well as the main seal 50. The lower and upper pilots 27a and 27b may be made of acetal material and/or polyetheretherketone (PEEK). Optionally, a Teflon braid 28 is used above the packing 26 for lubrication.

Preferably, the packing 26 and the seal 50 are provided with a dry film of a lubricant on the interior surface against which the plunger 16 will bear. Any suitable dry or non-dry lubricant coating may be used, and even oils and greases may be used as well, as long as the lubricant is long-lasting and provides for low maintenance. Examples of dry film coatings which might be used to provide superior lubricity are the McLube lubrication products from McLube, A Division of McGee Industries Incorporated of Aston, Pa. Among the dry film coatings offered by McLube are McLube $MoS_2$-McLube 1700L. Such dry lubricants were used on packings for pumps at least at one time about twenty (20) years ago, though it is not known whether it has ever been used on plunger pumps for an annular packing such as that in accordance with the plunger pump shown in the preferred embodiment. The lubricant on the packing, as suggested above, bears against the exterior surface of the plunger 17 as the plunger 17 reciprocates within the plunger housing 16.

Figure 3:
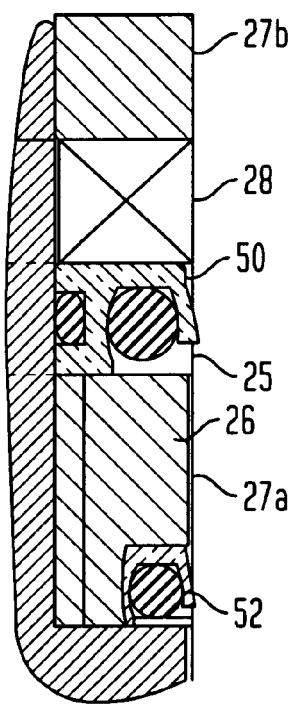
FIG. 3 is an enlarged cross-section of the sealing assembly shown in FIGS. 1 and 2.
Figure 4:
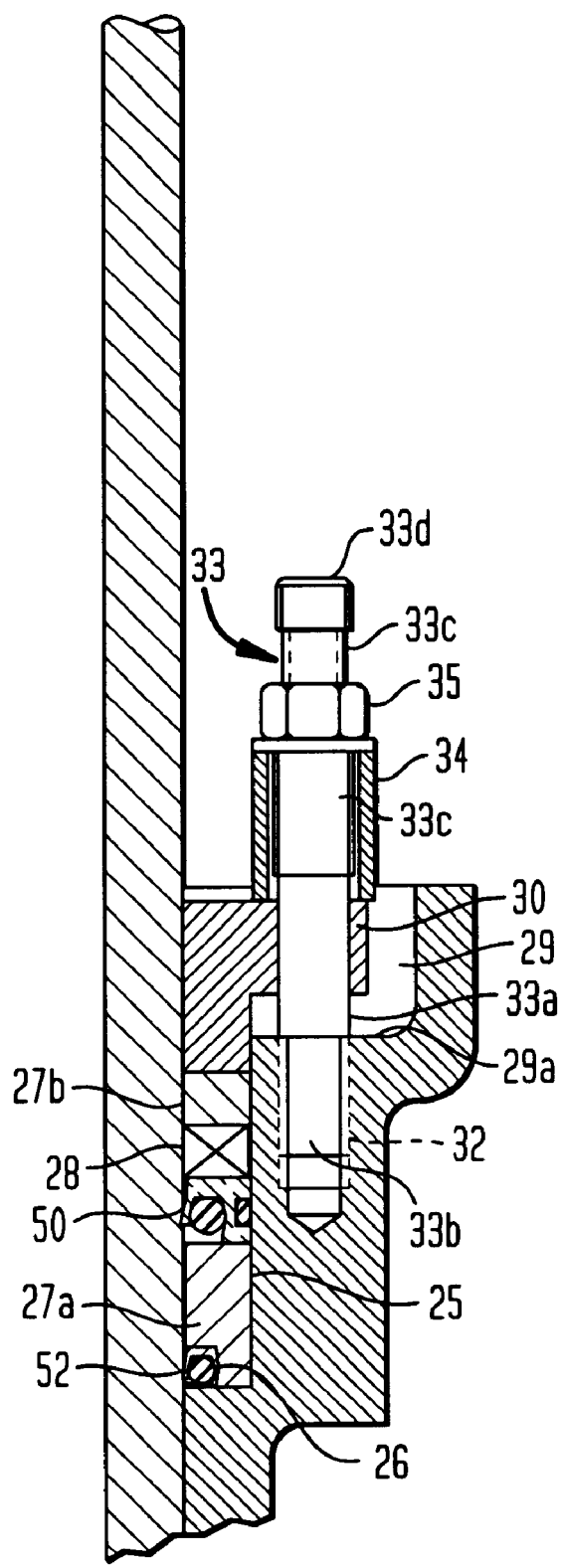
FIG. 4 is an enlarged cross-section of the adjustable packing gland assembly and sealing assembly shown in FIG. 1.

Above the stuffing box 25 in the plunger housing is an annular seat or a packing gland housing 29. A packing gland 30 is provided in this packing gland housing 29, the packing gland 30 having a packing edge which bears against the packing in the stuffing box 25. The packing gland 30 may thus extend at least partly into the stuffing box 25. In the prior art, the packing gland is a rigid cast piece (as is the plunger housing and packing gland housing). In accordance with one embodiment of the present invention, as shown in FIGS. 1, 3, and 4, the packing gland 30 may be made out of cast metal or any other suitable material.

The upper pilot 27b bears directly against the exterior surface of the plunger 17 with a clearance of about 0.005 inch to 0.010 inch. Thus, the exterior surface of the plunger 17 will ride along the packing 26, as well as the lower pilot 27a and the upper pilot 27b. The upper pilot 27b provides a "pilot" effect as it maintains the path of the plunger 17 during reciprocation, thus facilitating stabilization and a smooth, reciprocating action. This occurs with or without the lower pilot 27a. The lower pilot 27a also facilitates such action, the lower pilot 27a also providing lubricity and having a similar clearance tolerance as the upper pilot 27b (0.005 inch to 0.010 inch).

Figure 2:
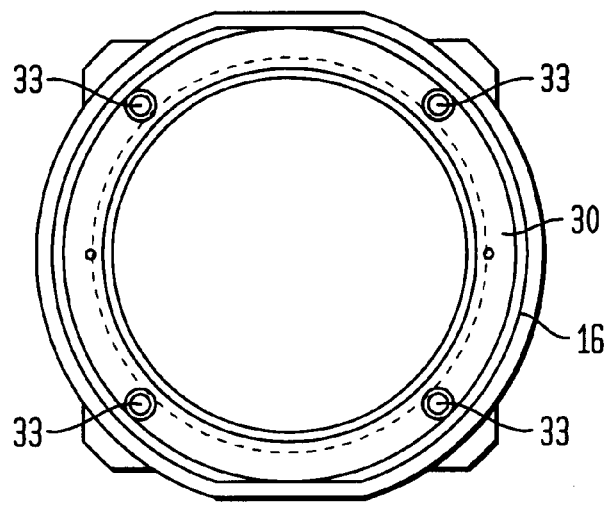
FIG. 2 is a top plan view of the adjustable packing gland in assembled position about the plunger cylinder and the plunger with the eccentric and connecting arm removed.

In accordance with another aspect of the present invention, a packing gland 30 is arranged such that it is adjustable in terms of its contact with the packing 26 and the seal 50. Bolt openings in the packing gland 30 facilitate such adjustment, there being four openings for four bolts in accordance with one embodiment (see FIG. 2).

FIGS. 1, 2, 3 and 4 show that bottom surface 29a of gland housing 29 has a plurality of generally uniformly spaced threaded bores as at 32. Into these bores 32 are fixedly threaded a corresponding plurality of packing gland studs 33. Each of the packing gland studs 33 preferably includes a generally smooth center section as at 33a with spaced threaded sections at the respective opposite ends of the center section as at 33c and 33b. On each of the respective packing gland studs 33, a shoulder or stop is established at the bottom of smooth center section 33a. To facilitate threading the studs 33 into threaded bores 32, a head 33d (shown in FIG. 4) can be provided with a suitable tool-engaging recess, such as a hexagonal recess.

As suggested above, the packing gland 30 is provided with a corresponding plurality of spaced longitudinal openings or bores to receive studs 33. The packing gland 30 can be slidably mounted onto smooth center sections 33a, which of course are preferably smooth, for free vertical movement and, with the preferable limited tolerance between the openings in the gland 30 and the center sections 33a, little or no horizontal movement of the gland 30 is permitted. This in turn facilitates the stabilization of the plunger 17 which bears against the stabilized packing gland 30.

The packing gland studs 33 are threaded into the associated threaded bores 32 until the shoulders bottom out on bottom surface 29a of the gland housing 29. The packing gland studs 33 are thus fixed into assembled position with limited tolerance.

The vertical adjustment of the packing gland 30, facilitating the imposition of force on the packing 26 and the seal 50 for sealing purposes, is made via the upper threaded section 33c on the studs 33 and an annular sleeve 34 which is provided about each stud 33. The annular sleeve 34 is in the form of a pipe in one embodiment, and includes an inner diameter greater than the outer diameter of the threaded and smooth portions of the stud 33 so that it is moveable thereon. Thus, as shown in FIGS. 1, 3, 4 and 5, the annular sleeve 34 bears directly on the upper surface of the gland 30, and is forced in this position by a threaded nut 35, which operates on upper threaded section 33c. The threaded nut 35 provides for adjustment of the gland. The stud 33 thereby provides for the stabilization of the gland 30, and thus the further stabilization of the plunger 17, by the shoulder of the center section 33a bearing against the housing at 29a and the tight tolerances between the center section 33 and the bores in the gland 30. Therefore, vertical adjustment of the position of the gland 30 is permitted without affecting the horizontal stabilization. Of course, tolerances must be properly engineered, but the result is the ability to increase the efficacy of the packing 26 through the adjustment of the packing gland 30.

Figure 5A:
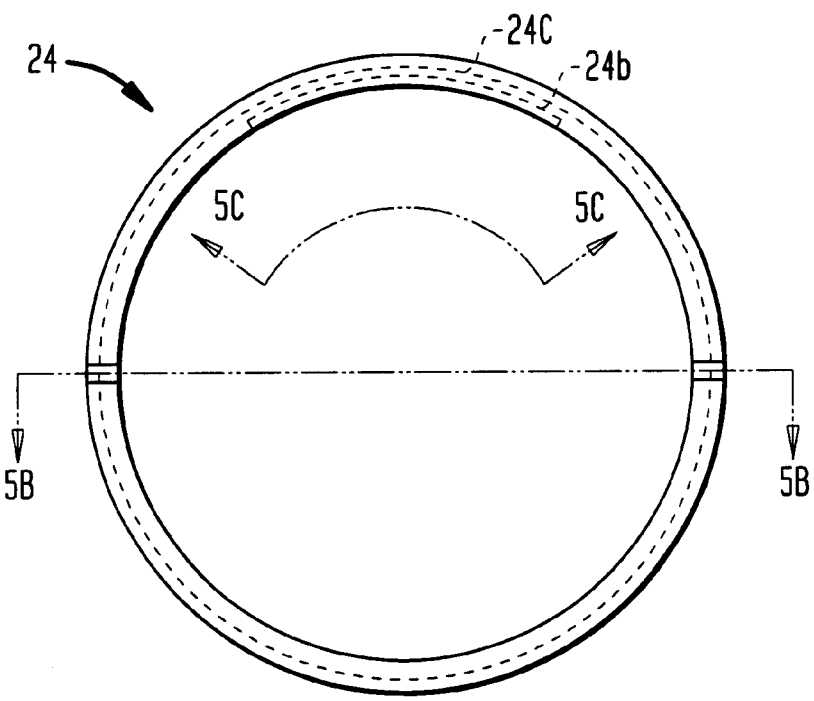
FIG. 5A is a plan view of the eccentric bearing liner for the eccentric shown in FIG. 1.
Figure 5B:
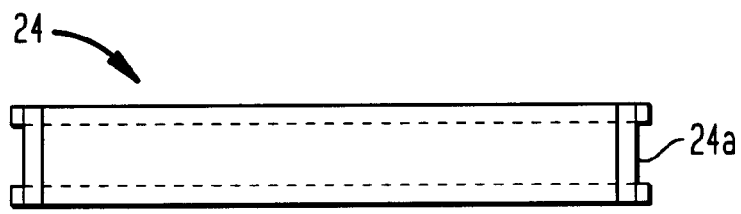
FIG. 5B is a cross-section of the liner taken on line 5B—5B in FIG. 5A.
Figure 5C:
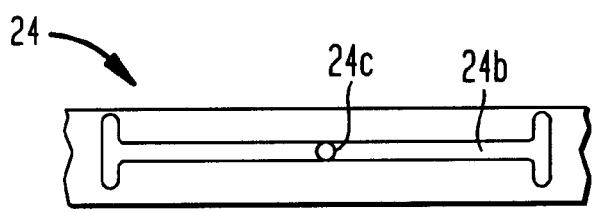
FIG. 5C is a cross-section of the liner taken on line 5C—5C in FIG. 5A.

Referring to FIGS. 5A–5C, the eccentric liner 24 is illustrated. It is of the same structure as prior liners, and in particular the prior Babbit liner. The liner 24 is disposed between the eccentric 22 and the connecting rod 21 and cap 23. The liner 24 bears between these elements to allow for the smooth operation of the eccentric 22, and thus the smooth operation of the plunger 17 connected to the eccentric 22 by connecting arm 21.

The liner 24 is preferably made up of split halves, as shown in FIG. 5A. This enables easier installation of the liner 24, and also easier replacement if that becomes necessary. As shown in FIGS. 5A and 5B, the liner 24 includes an annular recess 24a. This recess 24a accepts an annular portion of connecting rod 20. In addition, as shown in FIGS. 5A and 5C, a lubricant groove 24b is provided on a portion of the interior of the liner 24 which will bear against the eccentric plate 22. A lubricant opening 24c is also provided for introduction of the lubricant into the lubricant groove 24b. The lubricant opening 24c cooperates with the connecting rod cap 23, also having an opening, whereby a lubricant can be introduced into the lubricant groove 24b. An extension at the top of cap 23, as shown in FIG. 1, is associated with the lubricant opening 24c. A lubricant-injecting device can be attached to this extension for introducing a lubricant.

Preferably, little or no lubricant will be required at all with the liner 24 in accordance with the present invention. Liner 24 in accordance with the present invention is made of a high wear-resistant material, and thus the liner will have a longer life than a material with a high wear factor. Preferably, the material will also possess lubricity such that an external lubricant will not be required at all, or will be required on only an occasional basis. The material of which the liner 24 is made may enable a different, perhaps longer lasting, lubricant to be used. This could include a grease of some type as opposed to extensive use of an oil. The need for messy, mechanical oilers will hopefully be eliminated or decreased. The material of which the liner 24 is made will preferably include a lubricant built into the material itself. One such material is a lubricant-filled plastic. Other materials may also be used. With such a material, the hazard of disposing of a liner made at least partially of heavy metals is eliminated and the disposal of oil from the mechanical oilers prevalently used now can be eliminated or decreased as well. Also, the possible contamination of the fluid being pumped by the extensive use of a mechanical oiler is decreased.

The material of the lower pilot 27a, upper pilot 27b, gland 30 and the eccentric liner 24 is any suitable material which is relatively rigid, possesses high wear resistance and provides for a smooth operation of the mechanicals, such as the plunger. The material of the lower pilot and upper pilot possesses a low water absorption characteristic so that it may be submersed in water without changing the clearances. Preferably, the material for the packing gland 30 is a Nylon with a solid lubricant. One material that may be used is "Nylon 6" with a solid lubricant, a type of Nylon sold by DSM Engineering Plastic Products, Inc. of Reading, Pennsylvania under the trademark "Nylatron NSM." Preferably, the material for the lower pilot 27a and upper pilot 27b is acetal material and/or polyetheretherketone (PEEK) or at least a relatively high strength material which is resistant to impact, fatigue and water absorption.

Other materials having similar pertinent characteristics may be used for these components. Generally, a material should preferably be relatively rigid and be highly resistant to wear. In addition, the material of the eccentric liner and the lower and upper pilots should be resistant to water absorption so that they may be used in applications requiring submersion in water.

In this context, typical nylon (without a lubricant) has a wear factor of about 100, and the Nylatron NSM (which has lubricant) has a wear factor of about 9. In addition, acetal has a wear factor of about 200 and PEEK has a wear factor of about 100. Although acetal and PEEK have somewhat higher wear factors than the Nylatron NSM, it is desirable to use these materials since the water absorption characteristic for both material is low, i.e., acetal has a water absorption characteristic of about 0.9% at saturation and PEEK has a water absorption characteristic of about 0.5% at saturation. The low water absorption of acetal and PEEK prevents swelling of the material when submersed in water which could lead to the loss of clearances.

In operation, when the sealing assembly 25, 26, 27a and 27b, 28, 50, 52 and the operatively associated packing gland assembly 30 are being retrofit into an existing pump, the pump should be rendered inoperative, drained, and the plunger base area (defined by the plunger housing 16) and stuffing box 25 cleaned. Of course, when being fit into a new pump that would be unnecessary. A thin film of oil is hand applied to the stuffing box, the plunger bore area and the plunger surface. The pump is now ready for assembling the lower pilot 27a, upper pilot 27b, packing 26 and the packing gland 30 and other elements in accordance with the following steps:

slide lower pilot 27a into stuffing box 25 until it sits at the bottom surface of the stuffing box 25;

slide new piloted packing gland 30 onto plunger 17 without cocking it;

slide the gland 30 up over the top of the plunger 17 and place a rag between the upper pilot 27b on the packing gland 30 and the top of the plunger 17 to protect the upper pilot 27b from being damaged;

assemble connecting rod arm 21 to plunger 17, lift plunger/connecting rod assembly and center over plunger housing 16, and slowly lower plunger 17 into plunger base defined by the plunger housing 16 past stuffing box 25 until the plunger 17 enters the lower pilot 27a. Gently wiggle the plunger 17 while using its weight to help guide it through pilot 27a. Let plunger/connecting rod assembly rest in the bottom of the plunger base in the plunger housing 16 and slide gland 30 over plunger 17 for protection;

install and level pump shaft, and rotate plunger/connecting rod assembly until the rod 21 is perpendicular to the pump shaft and install lower eccentric liner 24 (half of eccentric liner). Loosen eccentric flange bolts, swing eccentric down to its lowest point, set in the longest stroke and snug eccentric flange bolts;

center eccentric over plunger/connecting rod assembly by loosening the eccentric flange set screws and sliding the eccentric assembly on the pump shaft until the eccentric is centered. Place the eccentric upper liner 24 in position. Set liner halves parallel to each other and reinstall shims between connecting rod arm 21 and cap 23 and tighten connecting rod bolts. Check liner 24 clearances and make any necessary adjustments;

rotate pump drive shaft so plunger 17 is at the top of its stroke;

reinstall oiler or oil connection, if needed;

install the packaging onto the lower pilot 27a with the flat side down;

each ring of the packing 26 should be firmly tamped into place using a packing installation tool;

carefully lower packing gland 30 into place;

install and tighten packing gland studs 33, install annular spacers 34 and associated threaded nuts 35 on the respective packing gland studs 33, and thread nuts 35 fingertight on the packing gland studs;

snug packing gland adjusting nuts 35 on gland studs 33 evenly, one quarter turn at a time so that the packing gland 30 falls between ³⁄₁₆' to ¼' from the machined top portion of the plunger housing. Gland 30 must be parallel with top of housing;

rotate shaft and check alignment—when centered, tighten eccentric flange set screws and tighten eccentric flange bolts; and start pump and check amp draw for acceptable limits. Check for leaks. If leakage occurs, shut down pump, tighten nuts one-sixth of a turn and start pump. Run pump ten minutes and check for leaks. Repeat until leakage stops. Monitor pumps for two to three hours for leakage.

While the invention has now been described with reference to several preferred embodiments and illustrated with regard to a range of optional features, those skilled in the art will appreciate that various substitutions, omission, modifications and changes may be made without departing from the spirit hereof. Accordingly, it is intended that the foregoing description be deemed merely exemplary of the preferred scope of the present invention and not to be deemed a limitation thereof and that the same is defined by the claims as hereinafter set forth.

What is claimed is:

1. A pump comprising:
   a pump housing having an interior;
   a pumping element disposed for movement within said pump housing for the purpose of moving a liquid through the pump;
   a seal associated with said pump housing and said pumping element for sealing the pump from the loss of liquid from the pump housing;
   a packing associated with said pump housing and said pumping element for assisting said seal in sealing the pump from the loss of liquid from the pump housing, said packing having a first side remote from the interior of said pump housing and a second side adjacent to the interior of said pump housing;
   a packing retention element for retaining said packing in position for its sealing function;
   a stabilizing element on said first side of said packing, said stabilizing element bearing against said pumping element during movement of said pumping element and facilitating the stabilization of said pumping element during its movement.

2. The pump in claim 1, further comprising:
   a scraper remote from said second side of said packing.

3. The pump of claim 2, further comprising:
   a secondary stabilizing element on said second side of said packing bearing against said pumping element during movement of said pumping element to provide further stabilization of said pumping element during its movement.

4. The pump of claim 3, wherein the clearance between said stabilizing element and said pumping element is about 0.005 inch and the clearance between said secondary stabilizing element and said pumping element is about 0.005 inch.

5. The pump of claim 3, wherein said secondary stabilizing element is twice as big as said stabilizing element.

6. The pump of claim 3, wherein said stabilizing element is made at least partially of acetal material and said secondary stabilizing element is made at least partially of acetal material.

7. The pump of claim 6, wherein said stabilizing element is made at least partially of polyetheretherketone and said secondary stabilizing element is made at least partially of polyetheretherketone.

8. The pump of claim 7 wherein said seal is made of UHMW polyethylene and said scraper is made of UHMW polyethylene.

9. The pump of claim 8, wherein the pumping element is a plunger for reciprocation within said pump housing.

10. The pump of claim 3, wherein said seal is made of UHMW polyethylene and said scraper is made of UHMW polyethylene.

11. The pump of claim 3, further comprising:
    at least one adjustment stud associated with said packing retention element and said pump housing for adjusting the force applied to the packing and the seal by the packing retention element to increase the sealing efficiency of the packing and the seal, said at least ones adjustment stud including a stabilizing section associated with said packing retention element to permit movement of said packing retention element in a first direction and to limit movement of said packing retention element in a second direction;
    and an adjustment section for permitting adjustment of said packing retention element in, a first direction.

12. The pump of claim 11, wherein said pump housing includes an area for receiving at least a portion of the packing retention element, said receiving area having a stop surface and at least one threaded opening, and said at least one adjustment stud further including a first threaded portion for threaded engagement within said threaded opening in the receiving area and a shoulder between said first threaded portion and said stabilizing section, the adjustment stud being threaded into said threaded opening until said should engages said stop surface.

13. The pump of claim 12, wherein a plurality of adjustment studs are provided, and wherein said packing retention element includes a plurality of stud opening to receive the stabilizing sections of it, and wherein said stabilizing sections are smooth.

14. The pump of claim 12, wherein said adjustment sections of said adjustment studs include a second threaded portion and a sleeve portion bearing on said packing retention element, said second threaded portion being remote from said first threaded portion, and an adjustment nut is provided on the second threaded portion for adjustably forcing said sleeve portion onto said packing retention element to facilitate the sealing function of the packing and the seal.

15. The pump of claim 3, further including a dry film lubricant on the packing to facilitate the sealing effect of said packing and said seal and permit smooth operation of said pumping element.

16. The pump of claim 3, wherein the pump is a plunger-type pump and said pumping element is a plunger, the pump further comprising:
    an eccentric connected to said plunger by a connecting arm, said eccentric further including an eccentric liner and being highly resistant to wear.

17. The pump of claim 16, wherein said eccentric liner further includes a lubricant additive to provide lubricity on the bearing surfaces of said eccentric liner.

18. The pump of claim 17, wherein said lubricant additive is a reinforced Teflon.

19. The pump of claim 3, further comprising:
    a plunger for movement within said pump;
    a pump housing;

an eccentric;

a connecting arm connecting said eccentric to said plunger to effect movement of said plunger within said pump housing;

an eccentric liner disposed between said eccentric and said connecting arm, said eccentric liner being made of a material highly resistant to wear.

20. The pump of claim 19, wherein the eccentric liner is made of a reinforced Teflon.

21. The pump of claim 1, wherein said stabilizing element is made at least partially of acetal material.

22. The pump of claim 1, wherein the pump is a plunger-type pump and said pumping element is a plunger for reciprocation within said pump housing, and wherein said packing retention element is a packing gland connected to said pump housing.

23. A pump comprising:

a pump housing having an interior;

a pumping element disposed for movement within said pump housing for the purpose of moving a liquid through the pump;

a seal associated with said pump housing and said pumping element for sealing the pump from the loss of liquid from the pump housing;

a packing associated with said pump housing and said pumping element for assisting said seal in sealing the pump from the loss of liquid from the pump housing, said packing having a first side remote from the interior of said pump housing and a second side adjacent to the interior of said pump housing;

a packing retention element for retaining said packing in position for its sealing function;

a stabilizing element on said first side of said packing, said stabilizing element bearing against said pumping element during movement of said pumping element with a clearance of about 0.005 inch to facilitate the stabilization of said pumping element during its movement;

a scraper remote from said second side of said packing; and a secondary stabilizing element on said second side of said packing bearing against said pumping element during movement of said pumping element with a clearance of about 0.005 inch to provide further stabilization of said pumping element during its movement wherein said secondary stabilizing element is twice as big as said stabilizing element.

24. The pump of claim 23, wherein said stabilizing element is made at least partially of acetal material and said secondary stabilizing element is made at least partially of acetal material.

25. The pump of claim 24, wherein said stabilizing element is made at least partially of polyetheretherketone and said secondary stabilizing element is made at least partially of polyetheretherketone.

26. The pump of claim 23, wherein said seal is made of UHMW polyethylene and said scraper is made of UHMW polyethylene.

27. The pump of claim 23, wherein the pump is a plunger-type pump and said pumping element is a plunger for reciprocation within said pump housing, and wherein said packing retention element is a packing gland connected to said pump housing.

* * * * *

UNITED STATES PATENT AND TRADEMARK OFFICE
CERTIFICATE OF CORRECTION

PATENT NO.   : 6,510,781 B2
DATED        : January 28, 2003
INVENTOR(S)  : Jeffrey Pecca, Frank Loetti, Jr. and John Diekman It is certified that error appears in the above-identified patent and that said Letters Patent is hereby corrected as shown below:

<u>Title page,</u>
Item [75], Inventors, "Diekman" should read -- Dieckman --.
Item [*], Notice, "3" should read -- 30 --.

<u>Column 12,</u>
Line 16, "sealby" should read -- seal by --.
Line 18, "ones" should read -- one --.
Line 34, "should" should read -- shoulder --.
Line 38, "opening" should read -- openings --.

Signed and Sealed this

Tenth Day of June, 2003

JAMES E. ROGAN
*Director of the United States Patent and Trademark Office*